US012793115B2

(12) United States Patent
Zhang et al.

(10) Patent No.: US 12,793,115 B2
(45) Date of Patent: Nov. 10, 2026

(54) INTELLIGENT RECOMMENDATION AT VARIOUS STAGES OF A WORKFLOW

(71) Applicant: Intuit Inc., Mountain View, CA (US)

(72) Inventors: Jingyuan Zhang, Mountain View, CA (US); Shankar Sankararaman, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 209 days.

(21) Appl. No.: 18/525,775

(22) Filed: Nov. 30, 2023

(65) Prior Publication Data

US 2025/0182180 A1 Jun. 5, 2025

(51) Int. Cl.

*G06Q 30/00* (2023.01)
*G06Q 30/0601* (2023.01)
*G06Q 40/12* (2023.01)

(52) U.S. Cl.

CPC ....... *G06Q 30/0631* (2013.01); *G06Q 40/123* (2013.12)

(58) Field of Classification Search

CPC ......................... G06Q 30/0631; G06Q 40/123
See application file for complete search history.

(56) References Cited

U.S. PATENT DOCUMENTS

2022/0229636 A1* 7/2022 Nayak ................ G06Q 10/0633

OTHER PUBLICATIONS

Lilan C, Yongsheng C. "Intelligent recommendation system based on decision model of archive translation tasks." Front Comput Neurosci. Nov. 4, 2022;16:1048047. doi: 10.3389/fncom.2022.1048047. PMID: 36405783; PMCID: PMC9672819. (Year: 2022).*

* cited by examiner

*Primary Examiner* — Anand Loharikar
(74) *Attorney, Agent, or Firm* — Lathrop GPM LLP

(57) ABSTRACT

Methods and a computer system are provided for recommending digital products based on user state. An application state is received at an endpoint. The endpoint is a single endpoint that includes a plurality of models. Each model of the plurality is trained on a corresponding dataset including features of the application state extracted at different stages of a workflow. The application state is matched to a first stage of the workflow and the first model is selected from the plurality of models. The first model corresponds to a first stage of the workflow. The first model processes the application state to select a first digital product of a plurality of digital products, which is presented as a recommendation to the user at the first stage of the workflow.

8 Claims, 6 Drawing Sheets

Data Structure 200

| Customer ID | Stage | Timestamp | Read Tax Article? | | Clicks on Web Page | Dependents | | Has RSU? |
|---|---|---|---|---|---|---|---|---|
| ID123 | 1 | 100001 | 1 | ... | 2 | N/A | ... | N/A |
| ID456 | 1 | 100023 | 0 | ... | 3 | N/A | ... | N/A |
| ID456 | 2 | 100063 | 1 | ... | 4 | 0 | ... | 1 |
| ID789 | 2 | 100081 | 1 | ... | 5 | 1 | ... | 0 |

210 Subset

220 Subset

FIG. 2

INTELLIGENT RECOMMENDATION AT VARIOUS STAGES OF A WORKFLOW

BACKGROUND

In the realm of machine learning, precision in personalized recommendation systems is an ever-pressing concern. personalized recommendation systems serve as integral guides to users in navigating the realm of ecommerce products. The accuracy of product recommendations is pivotal, influencing user satisfaction and the effectiveness of user decision-making. However, the multifaceted nature of user data and the evolution of their preferences as they journey through a workflow present a formidable challenge to the precision of machine learning models, particularly those that take a one-size-fits-all approach. Traditional models designed to fit all users invariably fall short in delivering the requisite precision, laying the foundation for a data-driven accuracy challenge.

SUMMARY

According to one aspect of the invention, a method is provided for recommending digital products based on user state. The method includes receiving an application state at an endpoint. The endpoint is a single endpoint that includes multiple models. Each model is trained on a corresponding dataset including features of the application state that are extracted at different stages of a workflow. The method additionally includes matching the application state to a first stage of the workflow. The method also includes selecting a first model from the models. The first model corresponds to a first stage of the workflow. The method further includes processing, by the first model, the application state to select a first digital product of multiple digital products. The method further includes presenting the first digital product as a recommendation to the user at the first stage of the workflow.

According to another aspect of the invention, a method is provided. The method includes generating datasets from features of application state. Each data set of the multiple datasets includes features that are extracted from the application state at discrete stages of a workflow. The method additionally includes training a plurality of models. Each model of the plurality of models is trained from a discrete dataset of the plurality of datasets. The method further includes deploying the plurality of models to a single endpoint.

According to another aspect of the invention, a computer system is provided, including a data repository and a server. The data repository stores data sets. Each data set of the multiple datasets includes features of an application state that were extracted at different stages of a workflow. The server includes models and an application. Each model is trained from a discrete dataset of the multiple datasets. The models are deployed to a single endpoint. When executed by a processor, the application is configured to receive an application state at the endpoint, to select, based on the application state, a first model from the multiple models, wherein the first model is trained from a first dataset including a first set of features extracted from the application at a first stage of the workflow, to classify, with the first model, the application state as a first digital product of multiple digital products that are offered to the user at the discrete stages of the workflow, and to recommend the first digital product to the user at the first stage of the workflow.

Other aspects of the invention will be apparent from the following description and the appended claims.

BRIEF DESCRIPTION OF DRAWINGS

FIG. 2 is a data structure shown according to one or more illustrative embodiments.

Like elements in the various figures are denoted by like reference numerals for consistency.

DETAILED DESCRIPTION

In general, embodiments are directed to a unified data collection, model training and deployment system that hosts multiple product recommendation machine learning models. Different machine learning models are trained based on the information available at selected application states or different stages of a workflow. Thus, each model leverages the most relevant information to predict and recommend a product to the user at that particular stage of the workflow.

Repeating this process at multiple points, multiple models may be trained from the most relevant information available at that particular stage of the application process. By training multiple models corresponding to different stages of the workflow, more accurate recommendations may be provided to customers throughout the application process from the initial research phase to the final decision-making phase. These more accurate recommendations ultimately improve customer experience and satisfaction.

The models are deployed using a unified, flexible, and adaptable endpoint that may provide customized recommendations based on the particular stage of the customer's workflow. By using one endpoint that supports multiple models, the system may reduce the processing, integration, and maintenance times, as well as, their associated costs to a company. For example, adding a new workflow point may be performed as a simple last-mile optimization that may be completed within several days, rather than requiring multiple months for model development and system integration.

For example, in the use case for a tax filing process, during an initial research phase, an unauthenticated customer may not provide any tax-related information. Rather, the customer may visit some tax product-related websites or read some tax articles. These activities may be monitored, and used as features to train a first recommendation model. Subsequently, when an anonymous user comes to the tax product website, the corresponding model, trained without personal tax information, is called to recommend the best-fit tax product to the customer.

In another example, in the area of personal finance, a customer enters personal financial information, such as spending, income, investments, etc., at different stages of a personal finance product. Based on the evolving amount of information, the personal finance product uses different models to recommend different financial solutions at different stages, such as investment products, loans, credit cards, etc.

At a later stage when a customer has logged into the website, additional information may be provided such as income levels, marital status, etc. A second recommendation model may be trained from this refined information. For example, at a later stage when a customer would like to make decisions about his tax filing, the second model that is trained with more information will be called.

Figure 1:
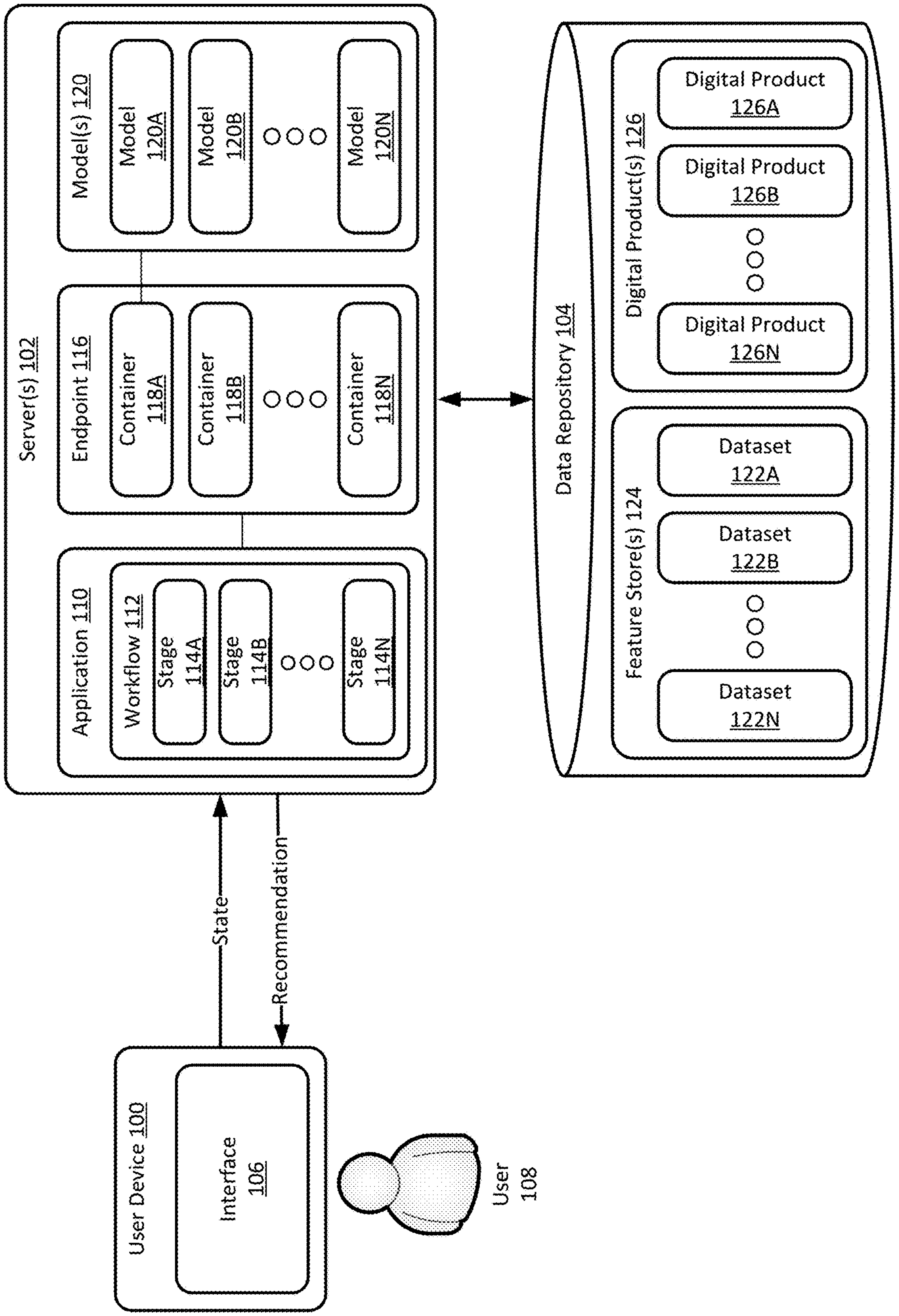
FIG. 1 shows a computing system in accordance with one or more embodiments of the invention.

Turning to FIG. 1, a diagram of a computing system is illustrated in accordance with one or more embodiments. As illustrated, the computing system includes a user device (100), a server (102), and a data repository (104).

The system shown in FIG. 1 includes a user device (100). A "user device" refers to a physical or virtual entity utilized by an individual for accessing and interacting with computer-based systems, applications, or services. The user device (100) encompasses various hardware or software components that enable users to perform tasks, access information, or communicate with other entities. The user device (100) may take different forms, including, but not limited to, desktop computers, laptops, smartphones, tablets, wearable devices, and virtual machines.

The user device (100) includes an interface (106) that enables a user (108) to interact with the application (110). As used herein, an "interface" refers to a defined boundary or connection point between different components and/or systems. The interface facilitates the exchange of information, commands, or data between software applications and/or system components in a standardized and consistent manner. Interface (106) may be manifested in various forms, including a graphical user interface (GUI) and an application programming interface (API).

In some embodiments, the interface (106) may be a progressive graphical user interface (GUI) having various pages that correspond to different stages (114A, 114B, . . . 114N) of the workflow (112). The GUI pages are designed to guide user (108) seamlessly through the workflow (112), facilitating data collection, task completion, and decision-making at each stage. Each page of the GUI serves as a visual interface for users to interact with and complete specific tasks or provide input relevant to that step in the workflow. The structured sequence of GUI pages ensures adherence to the actions, decisions, and data entry as the user (108) progressively navigates through the workflow (112).

The system shown in FIG. 1 includes one or more server(s) (102). The server(s) (102) is one or more computers, possibly communicating in a distributed computing environment. The server(s) (102) may include multiple physical and virtual computing systems that form part of a cloud computing environment. Thus, the server(s) (102) includes one or more processors. The processor may be hardware, or a virtual machine programmed to execute one or more controllers and/or software applications. For example, the processors of the server(s) (102) may be the computer processor(s) (602) of FIG. 6A.

The server(s) (102) may host application(s) (110), such as websites, and may serve structured documents (hypertext markup language (HTML) pages, extensible markup language (XML) pages, JavaScript object notation (JSON) files and messages, etc.) to interact with user device (100) connected via a network. Execution of the instructions, programs, and applications of the server(s) (102) is distributed to multiple physical and virtual computing systems in the cloud computing environment The workflow (112) is software process that defines a structured sequence of interconnected tasks for performing a specific goal or objective within application (110). Each step of the sequential series may depend on the successful completion of the previous steps and may incorporate conditional logic, user roles, integration with other systems, notifications, data handling, and customization to meet specific business requirements. For example, the workflow (112) may be a software process for filing income taxes.

The server (102) may include one or more endpoint(s) (116) to which one or more container(s) (118A, 118B . . . 118N) may be deployed. As used herein, an "endpoint" refers to a specific device, node, or client application that is connected to a network. The endpoint(s) (116) describe the points at which data or communication begins or ends in a network. The endpoint(s) (116) is a "unified endpoint." As used herein, a "unified endpoint" is a single, versatile, and adaptable point of access in a software or network system that may serve multiple functions or purposes. The unified endpoint is a centralized interface or node that brings together various components, services, or models, allowing them to be accessed or controlled from a common location.

Each container(s) (118A, 118B . . . 118N) is a lightweight, standalone, and executable package that contains all the necessary components, including code, runtime, libraries, and system tools, required to run a software application. Multiple containers may run on the same machine and share the operating system (OS) kernel with other containers, each running as isolated processes in user space. Container(s) (118A, 118B . . . 118N) may be a Docker container built on the Docker containerization platform.

In some examples, the endpoint(s) (116) may host and manage multiple the machine learning model(s) (120), with multiple models (120A, 120B, . . . 120N) deployed in a single container (118A). A machine learning model is a computational algorithm or system that leverages data to make predictions, decisions, or classifications without being explicitly programmed for a specific task. The models learn patterns and relationships within the data, enabling the models to generalize and perform tasks that have not been seen during training. The different models (120A, 120B, . . . 120N) may each be trained from a different one of the datasets (122A, 122B, . . . 122N).

In some embodiments, the machine learning model(s) (120) include one or more classification models. A "classification model" is a computational model or algorithm designed to categorize or assign input data into predefined classes or categories based on their features or characteristics. Classification models aim to determine the most appropriate class label for a given input based on patterns or relationships learned from training data. Classification models may be based on various architectures and/or techniques, such as statistical analysis, logistic regression, decision trees, random forest, support vector machines, and/or neural networks.

In some embodiments, the machine learning model(s) (120) includes a multi-class classification model. The multi-class models are used when users are presented with a range of product options, and the user chooses the most relevant one. The models categorize the user's application state into products classes and predict which product aligns best with the user's needs.

In some embodiments, the machine learning model(s) (120) includes one or more binary classification models, with each model corresponding to a different product option. These models categorize the user's application state to determine whether a particular product aligns with the user's needs. Relevant products may be presented to the user when the prediction meets a threshold value for model confidence.

In some embodiments, the machine learning models (120) are trained using supervised machine learning techniques and rely on data retrieved from the feature store. Training labels are derived from the digital products (126A, 126B, 126N) that are selected by user (108) during when performing the workflow (112). To facilitate scaling, each of the machine learning models (120) may be trained using a same pipeline that is re-usable across the different stages (114A, 114B, . . . 114N) of the workflow (112).

In some embodiments, the machine learning model(s) (120) may include one or more artificial neural networks with one or more layers. For example, the machine learning model(s) (120) may include a recurrent neural network, a long-short term memory (LSTM), a gated recurrent unit (GRU), a transformer neural network, a fully connected network, etc.

The system shown in FIG. 1 includes a data repository (104). In one or more embodiments of the invention, the data repository (104) is any type of storage unit and/or device (e.g., a file system, database, data structure, or any other storage mechanism) for storing data. Further, the data repository (104) may include multiple different, potentially heterogeneous, storage units and/or devices.

The data repository (104) includes a feature store(s) (124) that stores all the features generated for machine learning. The features may be raw data or derived attributes that are used as inputs for training and inference. These features may be stored in a structured format that facilitates accessibility, organization, and versioning.

The feature store(s) (124) includes multiple datasets (122A, 122B, . . . 122N). As used herein, and as known in the art, a dataset is a collection of structured data that is used to train, test, and evaluate machine learning models (120). The datasets may include input data and output data. The input data are features, variables, attributes, and/or characteristics that are used by the model to predict output data. The input data may be numeric, categorical, or text data that is used by the model to predict output data such as labels, targets, values and/or categories. For example, in a dataset for sentiment analysis of product reviews, the labels could be "positive," "negative," or "neutral" sentiments associated with each review.

In some embodiments, the different datasets (122A, 122B, . . . 122N) correspond to the different stages (114A, 114B, . . . 114N) of the workflow (112), with each data set including features of an application state that were extracted at the different stages. For example, dataset (122A) includes features of application (110) extracted at stage (114A), while datasets (122B, . . . 122N) respectively include features of application (110) extracted at stages (114B, . . . 114N) of the workflow (112).

For example, in the context of a tax preparation, when users are anonymous and not yet logged in, their clickstream behavior is logged, including the pages they visit, the articles they read, and the actions they take on the platform. At the initial research phase, where customers may be anonymous or provide minimal information, the model might primarily rely on browsing behaviors and page visits. This information may be recorded as a first one of the data sets, and used to train a first one of the models.

As user (108) progresses through the workflow (112) and becomes authenticated, richer data sources become accessible, such as the information about their income, deductions, and other financial details. This information may be recorded as a second one of the data sets, and used to train a second one of the models.

The process is repeated for multiple stages of the workflow (112). The end result is a suite of models capable of providing highly specific recommendations. Output from the models is a recommendation for one or more digital product(s) (126), which align with the user's tax situations at a particular stage of the workflow (112).

While FIG. 1 shows a configuration of components, other configurations may be used without departing from the scope of the invention. For example, various components may be combined to create a single component. As another example, the functionality performed by a single component may be performed by two or more components.

Turning now to FIG. 2, a data structure is shown according to one or more illustrative embodiments. The data structure (200) may be used to store features of an application state. Different subsets of the features may be used as data sets for training the machine learning models.

The data structure (200) may be used in a feature store(s) (124) of FIG. 1, and is capable of accommodating multiple data sets with varying fields, for efficiently managing and utilizing customer information in a tax preparation website. The data structure includes several fields to facilitate personalized tax product recommendations and maintain historical user data.

The "Customer ID" is employed as a unique identifier, ensuring that data for each user may be efficiently retrieved and updated. The Customer ID may act as a primary key that enables efficient data retrieval for real-time recommendations and data analysis.

The "Stage" field categorizes users into different stages of the tax preparation workflow, such as "Initial Research Phase," "Income Input Phase," and "Deductions & Credits Phase," etc. These phases may correspond to the Different stages of a workflow in a tax filing process. The "Timestamp" field records the date and time of data collection, offering historical tracking for user progression through various stages.

The "Read Tax Article" and "Clicks on Web Page" track user engagement during the initial research phase, with the former recording whether the user has read tax-related articles and the latter quantifying web page clicks. Taken together, these fields include a first subset (210) of the features that may be used to train a first machine learning model.

A second subset (220) of the features includes the prior fields, as well as, the additional "Dependents" and "Has RSU" fields. The "Dependents" field records the number of dependents a user has, while the "Has RSU" indicates whether the user possesses Restricted Stock Units that are relevant for stock-related tax considerations. Taken together, these fields include a second data set that may be used to train a second machine learning model.

Figure 3:
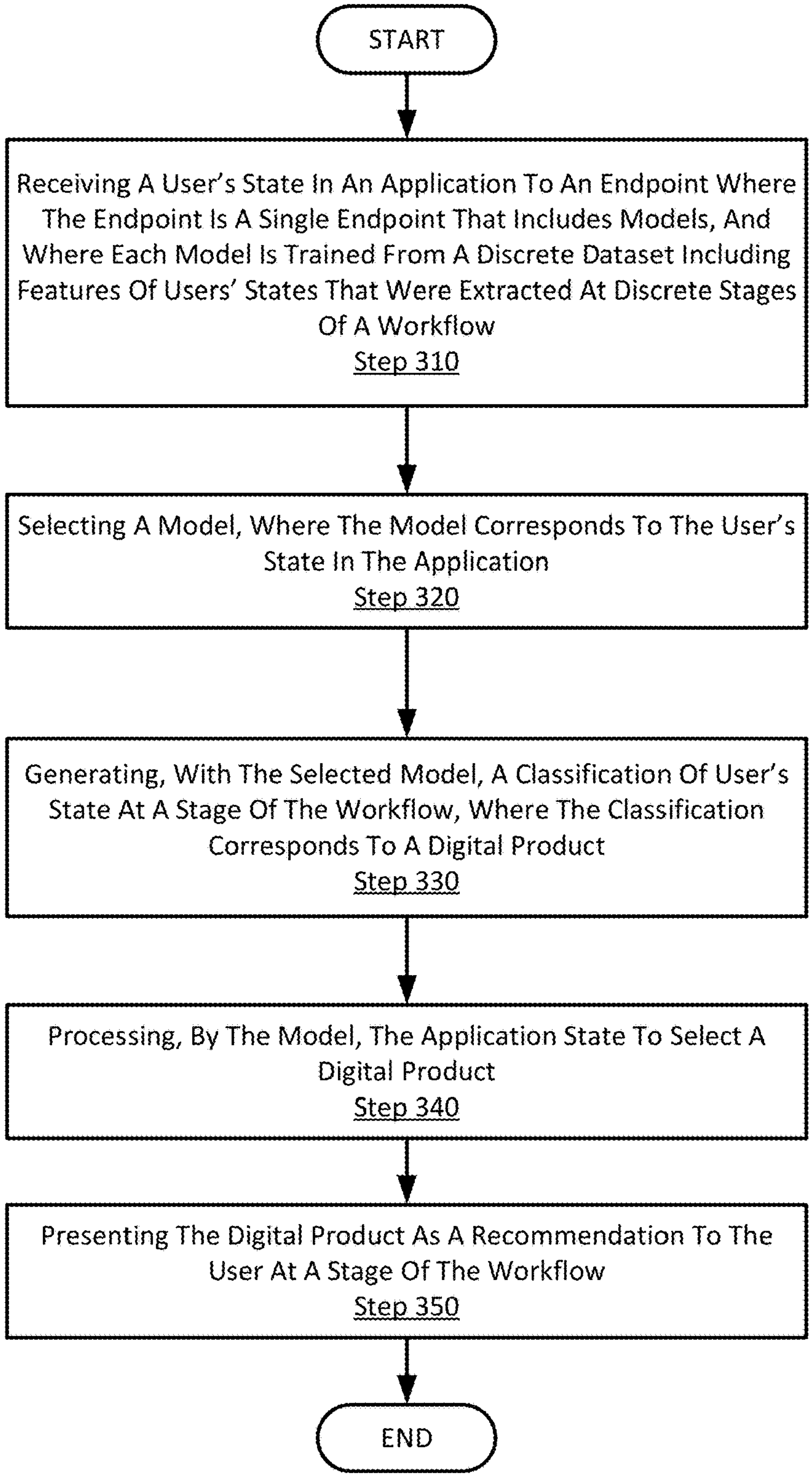
FIG. 3 is a method for recommending digital products based on user state according to illustrator embodiments.

Referring now to FIG. 3, a method for recommending digital products based on the application state is shown according to the various embodiments disclosed. The method of FIG. 3 may be performed using one or more of the components shown in the computer system of FIG. 1.

At step 310, an application state is received at an endpoint. The endpoint is a single endpoint that includes multiple models. Each model is trained on a corresponding dataset including features of the application state that are extracted at different stages of a workflow.

In some embodiments, the workflow is a tax filing process for a user displayed in a progressive user interface. The discrete stages of the workflow may be discrete screens of the progressive user interface. The digital products are tax products used for tax filings.

The user's application state may be received in a JavaScript object notation (JSON) object, the JSON object contains information about a user's interactions with an application, such as application (110) of FIG. 1. An example of the JSON object is provided as follows.

```
{
  "visitor_id": "1.0",
  "placement": "access_point1",
  "data": { ...
    }
}
```

The field "visitor_id": "1.0": is a unique identifier for the visitor. The ID is typically used for tracking and identifying individual visitors or users on a website or platform. In this case, the labeled identifier "visitor_id" has the value "1.0."

The field "placement" specifies the access point, context or location of the visitor's interaction. The "placement" field refers to a specific section or area of the website where the visitor is currently located or where an action is taking place, such as one of the stages (114A, 114B, . . . 114N) of the workflow (112). In this case, the placement field indicates labeled as "access point1," which may correspond to one of the machine learning models.

The field "data" stores additional information or data related to the visitor's interaction. The field may include an application state for the user, which is fed into the indicated machine learning model (i.e., "access point1") as input.

At step 320, the application state is matched to a stage of the workflow. In the JSON example above, the "placement" field refers to a specific section or page of the application where the visitor is currently located or where an action is taking place, such as one of the stages (114A, 114B, . . . 114N) of the workflow (112). In this particular example, the application state is matched to a corresponding "access point1" stage of the workflow.

At step 330, a model is selected from the multiple models. The selected model corresponds to a first stage of the workflow. In other words, the model is trained from a data set that includes features of an application state that were extracted at the first stage of the workflow.

In some embodiments, the first model is a multi-class classification model including classes corresponding to the digital products. In other embodiments, the first model is binary classification models, with each model corresponding to a respective one of the digital products. Given a customer's application state, the binary classification models predict a score of relevance for each digital product to be recommended.

In some embodiments, the first model, is selected by identifying a tag in the JSON that is associated with the first stage of the workflow. In the JSON example above, the placement field "access point1" is identified, which is mapped to a corresponding container and corresponding model within the container.

In some embodiments, the models are deployed to a discrete container of the containers on the endpoint. For example, a container image, which encapsulates the application and the application's dependencies, is pulled from a container registry, such as Docker Hub or Amazon ECR (Elastic Container Registry), and deployed to the endpoint, which is a target environment where the containerized machine learning models run. A container orchestration system, such as Kubernetes or a container management service like AWS (Amazon Web Service) ECS (Elastic Container Service), may be used to facilitate the deployment process and to manage the scheduling, scaling, and health of container instances. Deployment configurations, including the number of container replicas, resource allocations, and network settings, may be defined as code or through a configuration file to ensure consistency and scalability in container deployments.

At step 340, the first model processes the application state to select a first digital product of the multiple digital products. The application state is processed using a model by invoking the first container. Taking the application state as input, the model generates a predicted classification as one of the digital products. In some embodiments, the digital products are tax products used for a tax filing process.

At step 350, the first digital product is presented as a recommendation to the user at the first stage of the workflow, with the process terminating thereafter. The recommendation may be presented in an interface, such as interface 120A of FIG. 1.

Figure 4:
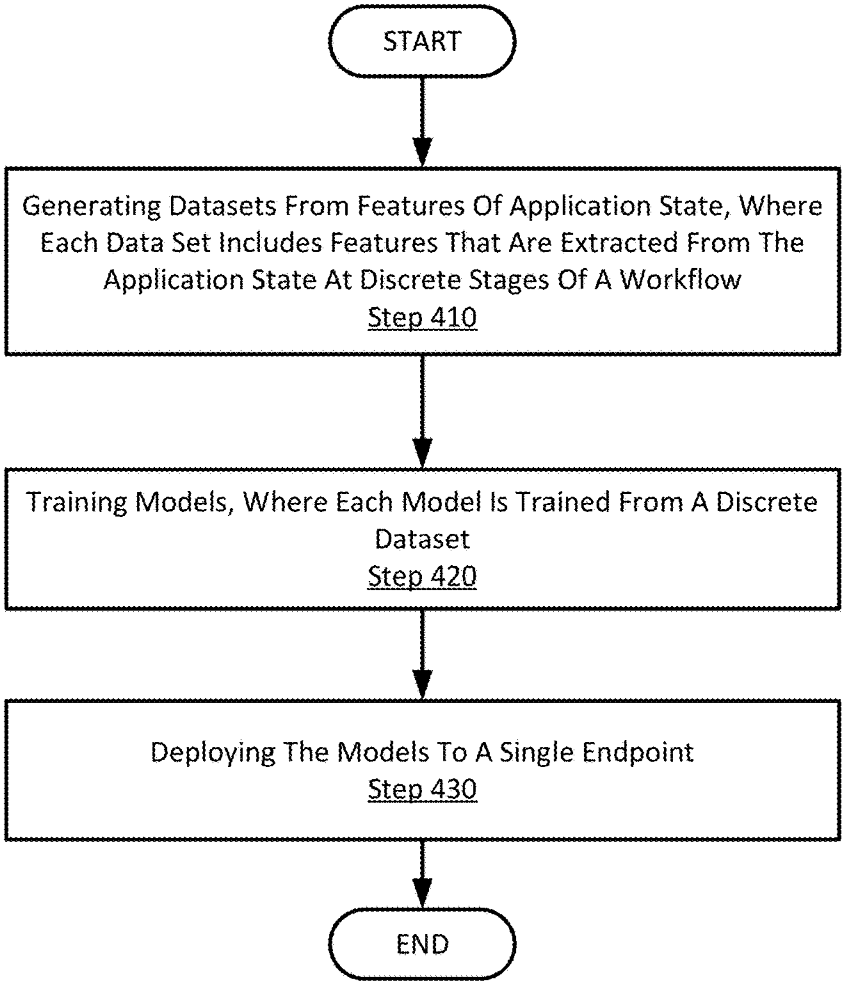
FIG. 4 is a method for deploying multiple machine learning models according to illustrator embodiments.

Referring now to FIG. 4, a method for deploying models is shown according to illustrative embodiments. The method of FIG. 4 may be performed using one or more of the components illustrated in the computer system of FIG. 1.

At step 410, the datasets are generated from features of application state. Each dataset includes features that are extracted from the application state at discrete stages of a workflow.

At step 420, the models are trained. Each model is trained from a discrete dataset of the multiple datasets.

At step 430, the models are deployed to a single endpoint, with the process terminating thereafter.

While the various steps in this flowchart are presented and described sequentially, at least some of the steps may be executed in different orders, may be combined or omitted, and at least some of the steps may be executed in parallel. Furthermore, the steps may be performed actively or passively.

The following example is for explanatory purposes only and not intended to limit the scope of the invention.

Figure 5:
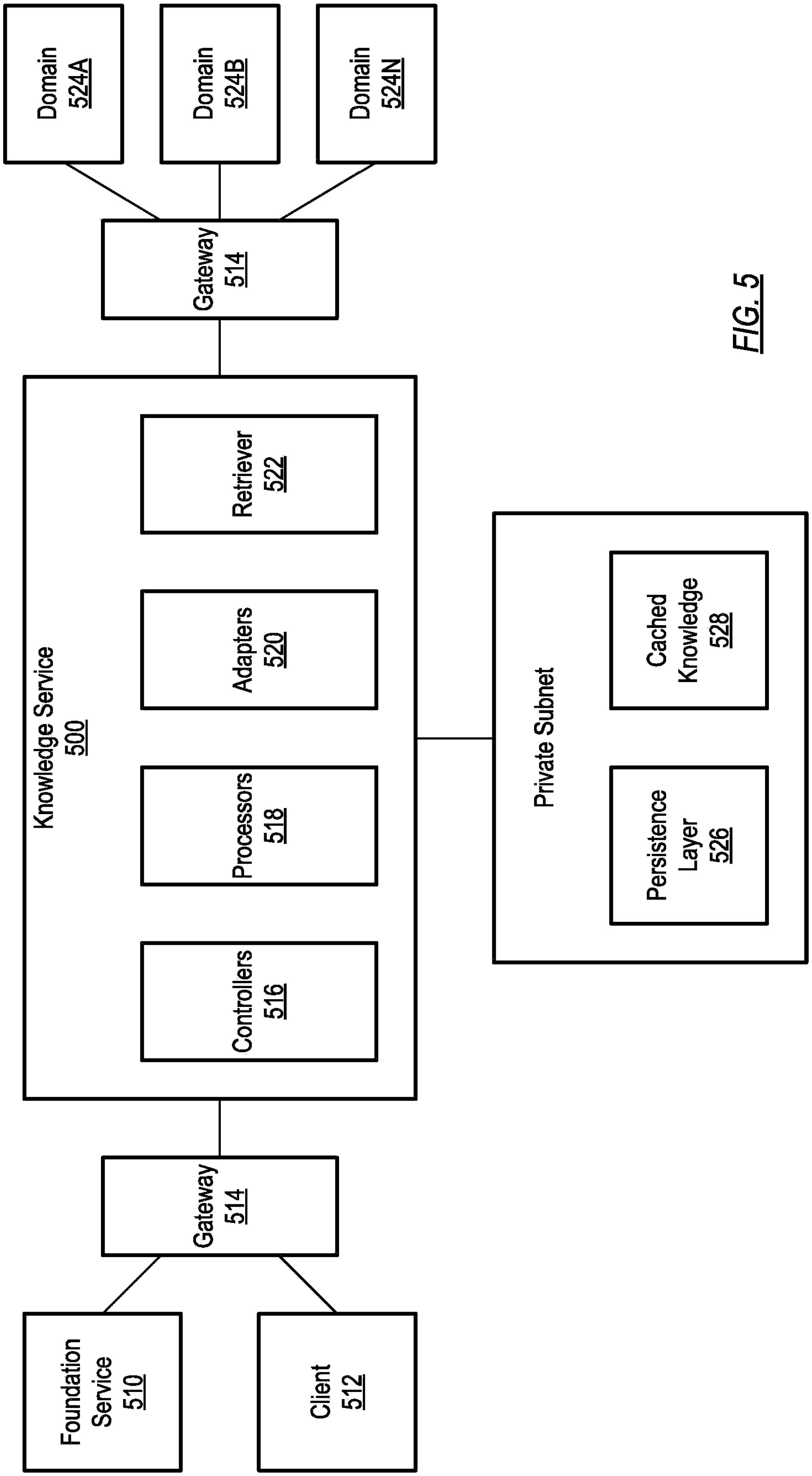
FIG. 5 is an example of a digital product recommendation system for a tax preparation use case in accordance with one or more embodiments of the invention.

Referring now to FIG. 5, an example of a digital product recommendation system is provided for a tax preparation use case. The example illustrated in FIG. 4 is one architecture that may be employed to implement the computer system of FIG. 1 for the described use case.

A user's interaction with a tax preparation website involves a complex process that encompasses several stages, from the initial point of entering the website to receiving a tailored recommendation for a tax product. This workflow is facilitated by a combination of front-end and back-end technologies, including user interfaces, server interactions, machine learning models, and endpoints.

The workflow begins when a user visits the tax preparation website, typically in the early stages of their tax-filing process. At this point, the user is often anonymous, meaning the user has not yet provided personal tax-related information. The user may be exploring tax-related content, such as articles, forms, or general tax information. The user interacts with the website's front-end, which includes the user interface elements like web pages, buttons, forms, and navigation menus. The initial interaction represents the earliest stage in the user's tax preparation workflow.

Data Collection (510)—As the user navigates the website, various actions are tracked and recorded. These actions include the pages the user visits, the amount of time spent on each page, the specific tax articles the user reads and any other interactions the user has with the site. This data collection process is critical for understanding user behavior and preferences during this initial research phase. The collected information forms the application state for this stage and is saved for future reference.

Periodically, the user's actions and interactions may be transmitted to the server for processing. The application state, containing data about the workflow, may also be sent to the server for further analysis. The interaction involves client-server communication, typically over HTTP or a similar protocol. The server processes the received data, updating the user's profile and application state as necessary.

Training (512)—At the server, the data is stored and used to train machine learning models. These models are designed to provide, for example, personalized tax product recommendations to one or more users. In the initial stage, where users may not provide any tax-related information, the model is based on the information gleaned from the user's browsing behavior. The training process involves supervised machine learning, where the training labels are based on historical data of tax products used by previous users with similar behaviors. Features are extracted from the user's application state and are used as input to these models. For example, if a user spends a substantial amount of time on pages related to small businesses, the model may infer an interest in tax products related to business taxes. The models are designed to be adaptive, as more information becomes available during the workflow.

The collected data at different points along the workflow is saved in a feature store database. The feature store database serves as a repository for all the data relevant to the recommendation models. The database is organized to maintain historical data for training purposes. As the user progresses through the workflow and provides more information, the data is continually updated with relevant feature values. The feature store database ensures that all necessary information for making recommendations is readily available for the machine learning models.

The tax preparation website, for example, uses a unified, flexible, and adaptable endpoint to support multiple trained recommendation models. The single endpoint acts as a gateway for real-time recommendation. The endpoint retrieves the application state from the feature store, and depending on the user's position in their tax preparation workflow, it calls the corresponding trained model for that stage. The use of a unified endpoint housing multiple models allows for customizing recommendations based on the specific workflow point.

The use of a unified endpoint streamlines the recommendation system. Instead of deploying separate endpoints for each stage of the workflow, which could be complex and resource-intensive, the single endpoint topology efficiently manages multiple models. The single endpoint topology also reduces processing overhead, simplifies integration, and minimizes maintenance time and costs for the tax preparation company.

Inference (514)—As the user interacts with the website and sends the application state to the server, the unified endpoint fetches the relevant feature data from the feature store database for the user's current workflow point and feeds the data into the appropriate machine learning model. The model then processes the data and makes real-time recommendations for the user.

In one or more embodiments, the recommendations are highly personalized taking into account the workflow point and the collected data specific to that point in the workflow. For instance, if the user is in the initial research phase, the recommendation may be for a general tax product. If the user has provided more information, such as income levels, the recommendation becomes more specific to the user's tax situation. This customization ensures that the recommended tax product aligns with the user's current needs and preferences.

The interaction is generally iterative. As the user progresses through different stages of their tax preparation workflow, the data collected, and the recommendations offered continue to adapt. The models evolve with the workflow providing more accurate and relevant recommendations as more information becomes available. The user's confidence in the recommended tax product is likely to grow as their engagement deepens and the recommendations become more precise.

Figure 6A:
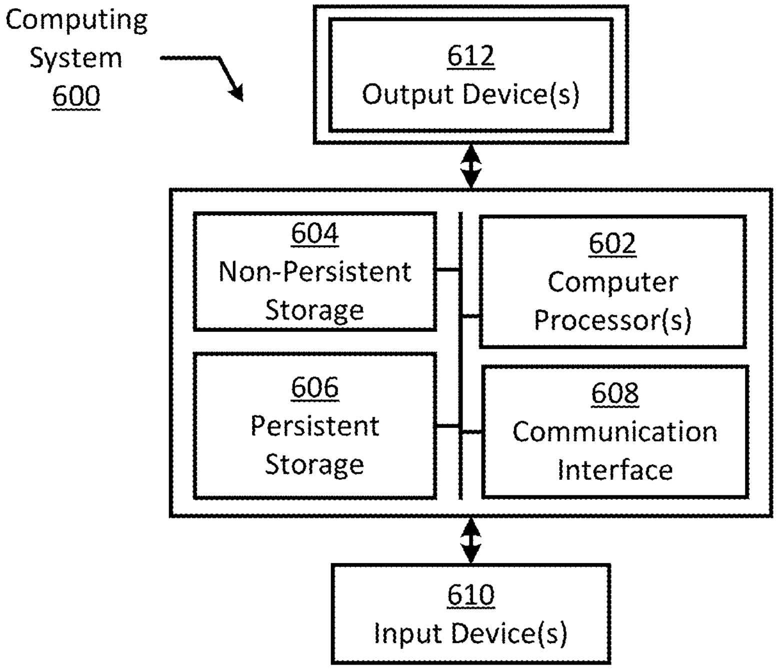
FIG. 6A and FIG. 6B is a computing system in accordance with one or more embodiments of the invention.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 6A, the computing system (600) may include one or more computer processors (602), non-persistent storage (604), persistent storage (606), a communication interface (608) (e.g., Bluetooth interface, infrared interface, network interface, optical interface, etc.), and numerous other elements and functionalities that implement the features and elements of the disclosure. The computer processor(s) (602) may be an integrated circuit for processing instructions. The computer processor(s) may be one or more cores or micro-cores of a processor. The computer processor(s) (602) includes one or more processors. The one or more processors may include a central processing unit (CPU), a graphics processing unit (GPU), a tensor processing units (TPU), combinations thereof, etc.

The input devices (610) may include a touchscreen, keyboard, mouse, microphone, touchpad, electronic pen, or any other type of input device. The input devices (610) may receive inputs from a user that are responsive to data and messages presented by the output devices (612). The inputs may include text input, audio input, video input, etc., which may be processed and transmitted by the computing system (600) in accordance with the disclosure. The communication interface (608) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the output devices (612) may include a display device, a printer, external storage, or any other output device. One or more of the output devices may be the same or different from the input device(s). The input and output device(s) may be locally or remotely connected to the computer processor(s) (602). Many different types of computing systems exist, and the aforementioned input and output device(s) may take other forms. The output devices (612) may display data and messages that are transmitted and received by the computing system (600). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other figures of the disclosure.

Figure 6B:
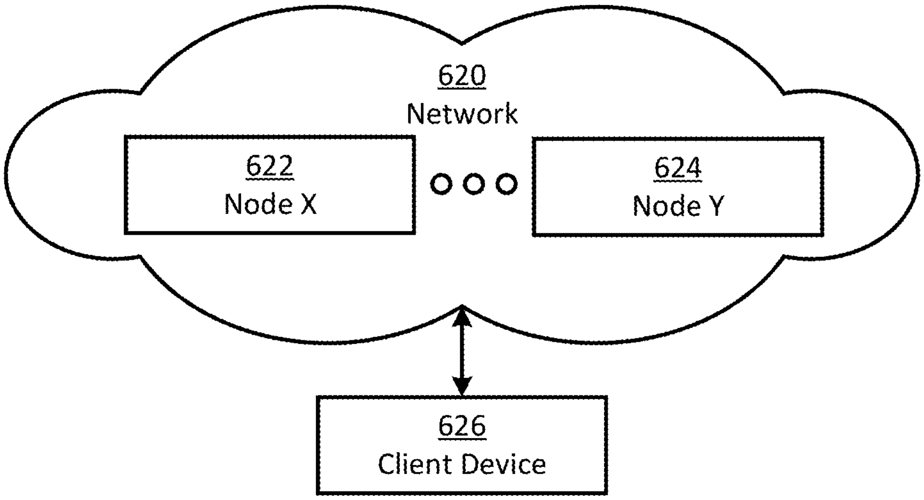

The computing system (600) in FIG. 6A may be connected to or be a part of a network. For example, as shown in FIG. 6B, the network (620) may include multiple nodes (e.g., node X (622), node Y (624)). Each node may correspond to a computing system, such as the computing system shown in FIG. 6A, or a group of nodes combined may correspond to the computing system shown in FIG. 6A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (600) may be located at a remote location and connected to the other elements over a network.

The nodes (e.g., node X (622), node Y (624)) in the network (620) may be configured to provide services for a client device (626), including receiving requests and transmitting responses to the client device (626). For example, the nodes may be part of a cloud computing system. The client device (626) may be a computing system, such as the computing system shown in FIG. 6A. Further, the client device (626) may include and/or perform all or a portion of one or more embodiments.

The computing system of FIG. 6A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above may be devised which do not depart from the scope of the claims as disclosed herein. Accordingly, the scope should be limited only by the attached claims.

What is claimed is:

1. A method for recommending digital products based on user state, comprising:

receiving an application state of an application at an endpoint, wherein the endpoint is a single endpoint that includes a plurality of machine learning models, wherein the application comprises a workflow comprising a plurality of stages, wherein each machine learning model corresponds to a particular stage of the plurality of stages of the workflow, wherein each machine learning model of the plurality of machine learning models is trained on a corresponding dataset, the corresponding dataset comprising features of the application state extracted at the particular stage of the workflow corresponding to the machine learning model;

matching the application state to a first stage of the plurality of stages of the workflow;

selecting a first machine learning model from the plurality of machine learning models responsive to the first machine learning model corresponding to the first stage of the workflow;

processing, by the first machine learning model, the application state to select a first digital product of a plurality of digital products; and presenting the first digital product as a recommendation to a user at the first stage of the workflow.

2. The method of claim 1, wherein the workflow is a tax filing process for a user displayed in a progressive user interface, and wherein the plurality of stages of the workflow is each a discrete screen of the progressive user interface.

3. The method of claim 1, wherein the plurality of digital products are tax products used for a tax filing process.

4. The method of claim 1, wherein the application state is a first application state, the method further comprising:

receiving a second application state at the endpoint;

selecting, based on the second application state, a second machine learning model from the plurality of machine learning models, wherein the second machine learning model is trained from a second dataset comprising a second set of features extracted from the application at a second stage of the workflow;

classifying, with the second machine learning model, the second application state as a second digital product of the plurality of digital products; and recommending the second digital product to a user at the second stage of the workflow.

5. The method of claim 1, wherein the first machine learning model is a multi-class classification model comprising a plurality of classes corresponding to the plurality of digital products.

6. The method of claim 1, wherein the first machine learning model is a plurality of binary classification models corresponding to the plurality of digital products.

7. The method of claim 1, wherein the plurality of machine learning models is deployed to a first container of a plurality of containers on the endpoint.

8. The method of claim 4, wherein the application state is received in a JSON object, and wherein selecting the first machine learning model further comprises:

identifying a tag in the JSON object associated with the plurality of stages of the workflow;

mapping the tag to a first container of a plurality of containers, wherein the first container is associated with the first stage of the workflow; and invoking the first container to process the application state with first machine learning model.

* * * * *